United States Patent

Yokose et al.

[11] Patent Number: 5,840,194
[45] Date of Patent: Nov. 24, 1998

[54] PROCESS FOR TREATING ARSENIC-CONTAINING WASTE WATER

[75] Inventors: Mamoru Yokose, Tokyo; Hiroshi Fujita; Koosoo Tao, both of Hiroshima; Hiroshi Baba, Hyogo-ken; Hideki Kamiyoshi, Hyogo-ken; Ranko Shikai, Hyogo-ken, all of Japan

[73] Assignee: Mitsubishi Jukogyo Kabushiki Kaisha, Tokyo, Japan

[21] Appl. No.: 761,858

[22] Filed: Dec. 9, 1996

[30] Foreign Application Priority Data

Jan. 16, 1996 [JP] Japan .................................. 8-004788

[51] Int. Cl.⁶ .......................................................... C02F 1/58
[52] U.S. Cl. .......................... 210/710; 210/713; 210/721; 210/724; 210/726; 210/911
[58] Field of Search .................................. 210/710, 713, 210/721, 724, 726, 737, 769, 911

[56] References Cited

U.S. PATENT DOCUMENTS

| | | | |
|---|---|---|---|
| 4,201,667 | 5/1980 | Liao | 210/911 |
| 4,566,975 | 1/1986 | Allgulin | 210/911 |
| 5,093,007 | 3/1992 | Domvile | 210/913 |
| 5,618,439 | 4/1997 | Allgulin | 210/911 |
| 5,651,895 | 7/1997 | Gordon | 210/911 |

FOREIGN PATENT DOCUMENTS

| | | |
|---|---|---|
| 49-20952 | 2/1974 | Japan . |
| 5120485 | 2/1976 | Japan . |
| 53-142042 | 12/1978 | Japan . |
| 60-125292 | 7/1985 | Japan . |
| 61-035894 | 2/1986 | Japan . |
| 2-207890 | 8/1990 | Japan . |

Primary Examiner—Peter A. Hruskoci
Attorney, Agent, or Firm—Bell Setlzer Intellectual Property Law Group of Alston & Bird LLP

[57] ABSTRACT

The present invention provides a process for treating arsenic-containing waste water, comprising adding an oxidizing agent, if necessary, to arsenic-containing waste water to oxidize trivalent arsenic in the waste water into pentavalent arsenic; adding a calcium compound to adjust the pH to 12 or higher; separating it into solid and liquid (first solid/liquid separation); calcining the resulting sludge, while adding a ferric salt to the treated solution to adjust the pH to 6–9 after the solid/liquid separation; and separating it into solid and liquid (second solid/liquid separation). According to the present invention, it is possible to remove arsenic from waste water efficiently to yield treated water satisfying various tolerance limits under various regulations, while the arsenic-containing sludge separated from the waste water can become harmless in subsequent continuous steps.

11 Claims, 3 Drawing Sheets

PROCESS FOR TREATING ARSENIC-CONTAINING WASTE WATER

BACKGROUND OF THE INVENTION

1. Field of the Invention

The present invention relates to a process for treating arsenic-containing waste water to make it harmless. More specifically, the present invention relates to a process in which arsenic-containing waste in water is agglomerated to yield treated water with an extremely low content of arsenic, and arsenic-containing sludge to be discharged, dried, and calcined for becoming an environmentally harmless composition.

2. Description of the Related Art

Conventional methods of treating arsenic-containing waste water which make it harmless by removing arsenic include adsorption, ion-exchange, sulfide precipitation, hydroxide coprecipitation, etc. A typical treatment method among these is the hydroxide coprecipitation method using a calcium compound, a magnesium compound, an iron salt etc. An example of treating arsenic-containing waste water in this method is outlined in FIG. 2. In the process shown in FIG. 2, arsenic-containing waste water 24, discharged from various factories, is introduced into reaction tank 21. Arsenic in the form of $As^{5+}$ is less soluble than $As^{3+}$ and is thus easily removed as precipitate. Hence, when the content of arsenite ion $As^{3+}$ in waste water is high, an oxidizing agent, if necessary, such as hydrogen peroxide, hypochlorite, etc., can be added thereto to oxidize the arsenite ion into arsenate ion $As^{5+}$ in the following reaction (1):

$$AsO_3^{3-} + [O] \rightarrow AsO_4^{3-} \qquad (1)$$

If a calcium compound or an iron salt is added to this waste water, it reacts as shown in the reaction (2) or (3) to form highly insoluble calcium arsenate or iron arsenate. FIG. 2 shows the addition of slaked lime 25 as one of typical examples using the above-mentioned calcium compound or iron salt.

$$3Ca^{2+} + 2AsO_4^{3-} \rightarrow Ca_3(AsO_4)_2 \qquad (2)$$

$$Fe^{3+} + AsO_4^{3-} \rightarrow FeAsO_4 \qquad (3)$$

In addition to these reactions, the calcium compound and iron salt both act as flocculants to gradually agglomerate the arsenic-containing precipitates formed in the reaction (2) or (3). Then, this reaction solution is introduced into precipitation tank 22 and like to separate solids from it, and the supernatant water is discharged out of the system as treated water 26. The precipitated sludge 27 containing an arsenic compound is removed from the bottom and discharged as dehydrated cake 29 through dehydrator 23. A part of the precipitated sludge 27 is returned as returning sludge 28 to the reaction tank 21.

The conventional process for treating arsenic-containing waste water described above suffers from the following drawbacks:

(1) No continuous treatment process is established covering the overall process extending from waste-water treatment to sludge treatment. That is, the overall process of the prior art ends by transferring arsenic in waste water to sludge, and a process for continuously treating the resulting arsenic-containing sludge is not established yet, thus producing many problems regarding pollution-control measures for the environment.

(2) The efficiency of removal of arsenic from waste water is low, and when a large amount of arsenic is contained in waste water, it is difficult to treat the waste water in a single operation to such an extent as to satisfy conventional effluent standards.

(3) When the arsenic-containing sludge generated in the treatment of waste water is discharged after simply being dehydrated or dried, arsenic may be eluted therefrom with rain or ground water to form other polluters.

SUMMARY OF THE INVENTION

The present invention solves such problems inherent in the prior art and provides an overall process for treating arsenic-containing waste water so that arsenic contained in waste water can be efficiently removed to satisfy various limits stipulated under various environmental regulations, and further for enabling the arsenic-containing sludge separated from waste water to become pollution-free.

The present invention is targetted to solve the above problems, and relates to:

(1) A process for treating arsenic-containing waste water, comprising adding a calcium compound to arsenic-containing waste water to adjust the pH to 12 or higher; separating it into solid and liquid (first solid/liquid separation); calcining the resulting sludge, while adding a ferric salt to the treated solution to adjust the pH to 6–9 after the solid/liquid separation; and separating the latter into solid and liquid (second solid/liquid separation).

(2) A process for treating arsenic-containing waste water, comprising adding an oxidizing agent to arsenic-containing waste water to oxidize the trivalent arsenic in the waste water into pentavalent arsenic; adding a calcium compound to adjust the pH to 12 or higher; separating it into solid and liquid (first solid/liquid separation); calcining the resulting sludge, while adding a ferric salt to the treated solution to adjust the pH to 6–9 after the solid/liquid separation; and separating the latter into solid and liquid (second solid/liquid separation).

(3) The process for treating arsenic-containing waste water according to (1) or (2) above, wherein the sludge after the second solid/liquid separation is returned to a waste water before treatment or to the waste water after the first solid/liquid separation.

(4) The process for treating arsenic-containing waste water according to any one of (1) to (3) above, wherein the ferric salt is added in such an amount that the weight ratio of the iron component of the added ferric salt to arsenic in waste water (Fe/As) ranges from 5 to 20.

(5) The process for treating arsenic-containing waste water according to any one of (1) to (4) above, wherein the temperature for calcination of the sludge ranges from 550° to 700° C.

Hereinafter, the action of the present invention is described. $As^{3+}$ is oxidized into $As^{5+}$ by adding an oxide such as peroxide, hypochlorite, if necessary, to arsenic-containing waste water, and then a calcium compound is added to adjust the pH to 12 or higher whereby arsenic ions and other heavy metals form hydroxides in the form of a flock. The calcium compound includes e.g. calcium hydroxide (slaked lime), calcium oxide (quick lime), calcium carbonate, calcium chloride, etc., or a mixture thereof.

The flock is separated from the reaction solution and a part of the sludge is returned to the untreated waste water while the remainder is dehydrated, dried and calcined. The calcined product thus obtained will have difficulty eluting into ground water after being embedded in the ground, thus keeping its effect on the environment to a minimum.

When a ferric salt and, if necessary, an acid are added to the treated solution after the solid/liquid separation to adjust the pH to 6–9, the remaining arsenic in the solution is encompassed by the flock of ferric hydroxide formed coincidentally, and coprecipitated with the flock. Further, the flock may be agglomerated by also adding a high-molecular flocculant to facilitate the solid/liquid separation. This flock is separated from the reaction solution, and the sludge is returned to the untreated waste water, or to the reaction solution already treated with the calcium compound. Alternatively, when the content of arsenic in the starting waste water is low, the sludge may be discharged directly to a sludge storage tank, thus resulting in stable treatment depending on the concentration of arsenic in the starting waste water.

The process of the present invention attains the following effects:

(1) The continuous overall treatment process extending from waste-water treatment to arsenic-containing sludge treatment is established to solve many problems of the prior art concerning pollution-control measures for the environment.

(2) Even when a large amount of arsenic is contained in waste water, it is possible to treat the waste water to such an extent as to satisfy the tolerance limit of 0.1 mg/l or less for toxic substance, as stipulated under the regulation of the Japanese Prime Minister's Office, thus contributing to the protection of the environment.

(3) The arsenic-containing sludge produced in the process for treating waste water is calcined under suitable conditions, whereby poisonous arsenic in the sludge, after being embedded in the ground, will not be eluted with rain or ground water, thus satisfying the limit of 0.3 mg/l or less arsenic, as stipulated under the enforcement regulation of the Japanese Waste Disposal Law, so that there is no danger of generating other pollutants.

DETAILED DESCRIPTION OF PREFERRED EMBODIMENTS

Figure 1:
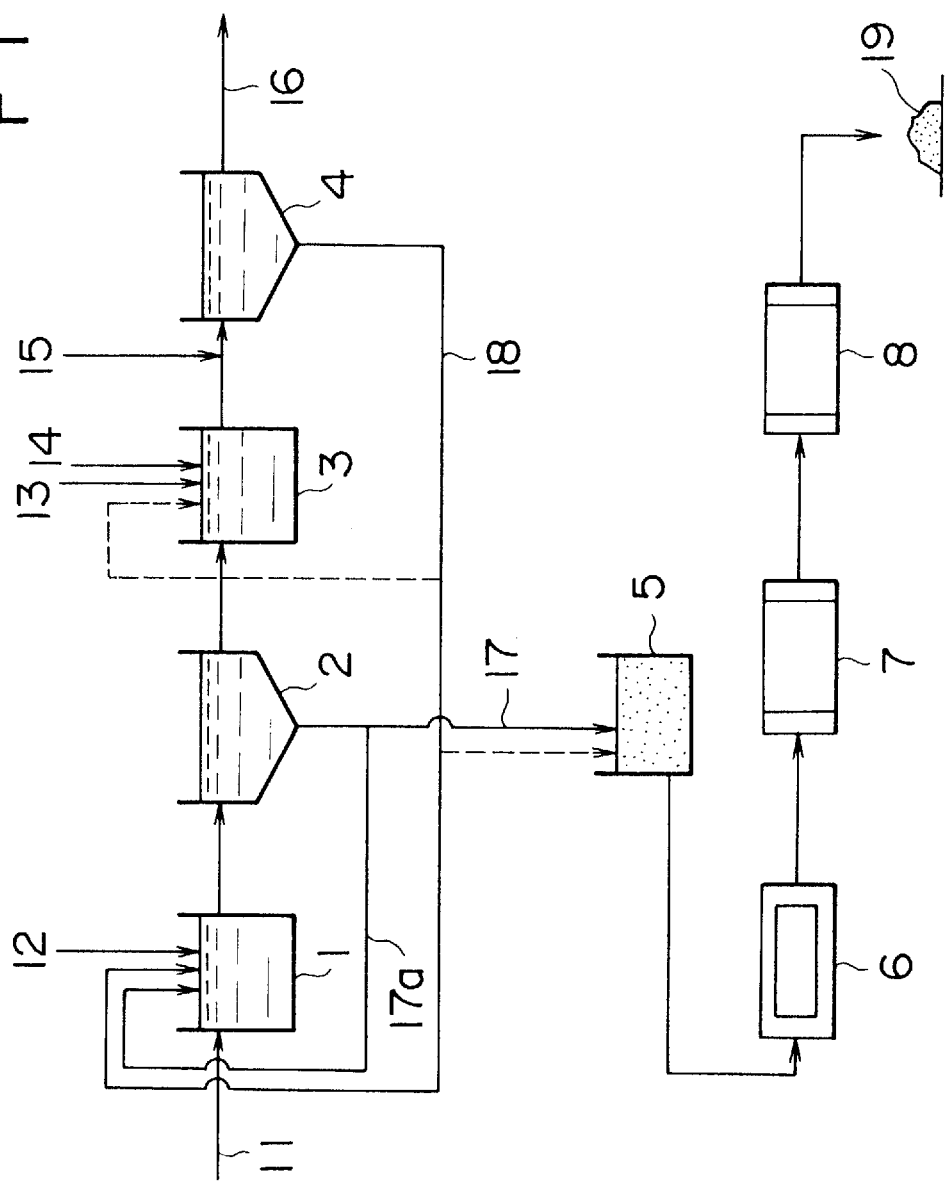
FIG. 1 is a schematic view illustrating an example of the process for treating arsenic-containing waste water according to the present invention.
Figure 2:
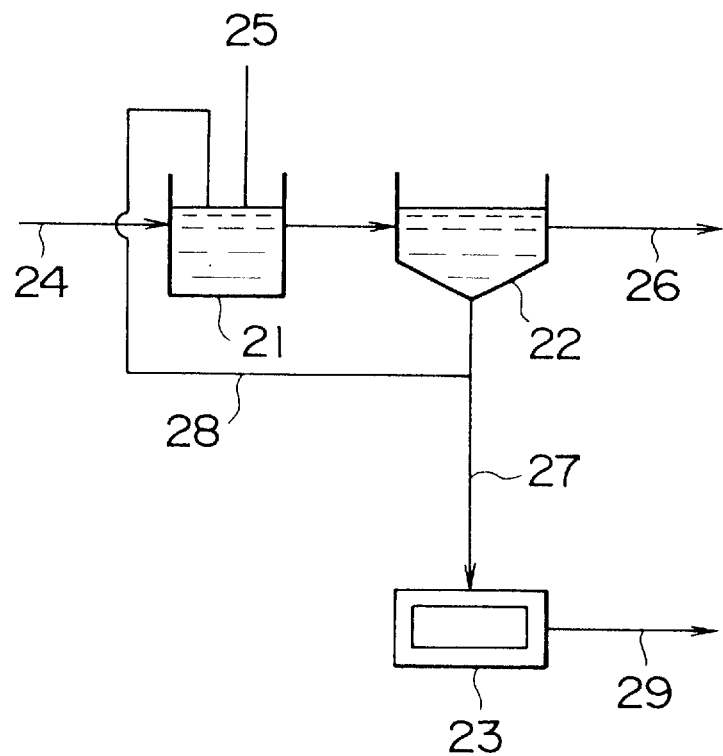
FIG. 2 is a schematic view illustrating an example of the conventional process for treating arsenic-containing waste water.

Hereinafter, the process of the present invention is described with reference to FIG. 1 where one example of the process is shown. In FIG. 1, numeral 1 is the first reaction tank, where waste water 11 is introduced and the pH is adjusted by adding slaked lime 12 and like; numeral 2 is the first agglomeration precipitation tank, where the agglomerates formed in the first reaction tank are precipitated and separated; numeral 3 is the second reaction tank, where the supernatant liquid discharged from the first agglomeration precipitation tank 2 is introduced and a flocculent is added, while the pH is adjusted; numeral 4 is the second agglomeration precipitation tank, where the agglomerated products formed in the second reaction tank 3 are precipitated and separated; numeral 5 is a sludge storage tank, where the arsenic-containing sludge (i.e. the first agglomerated and precipitated sludge 17 and the second agglomerated and precipitated sludge 18) precipitated and separated in the first agglomeration precipitation tank 2 and the second agglomeration precipitation tank 4 is received and stored; numeral 6 is a dehydrator, where the sludge supplied from the sludge storage tank 5 is dehydrated; numeral 7 is a dryer, where the cake formed in the dehydrator is dried; and numeral 8 is a calcination oven, where the solids dried in the dryer 7 are calcined.

In the above embodiment, waste water 11 discharged from various factories is introduced into the first reaction tank 1. Generally, $As^{5+}$ ion possesses a lower solubility than $As^{3+}$ ion and is thus easy to remove. Hence, $As^{3+}$, if present, may be treated in advance by adding an oxidizing agent such as hydrogen peroxide, sodium hypochlorite, etc., for oxidation treatment. If slaked lime 12 is added to this waste water 11, a hydroxide flock of heavy metals such as iron, copper, lead, etc., is formed in addition to a calcium arsenate flock. At this stage, calcium arsenate can be easily precipitated by adding slaked lime 12 to adjust the pH to 12 or higher, preferably 12.5 or higher. However, adjusting the pH to 13 or higher is enocomically disadvantageous because of a large amount of slaked lime required, although it does not affect the nature of the treatment. Accordingly, this reaction solution is then introduced into the first agglomeration precipitation tank 2 to carry out solid/liquid separation (the first solid/liquid separation). The solid/liquid separation is not limited to the example described below, e.g., filtration may also be adopted. After being stood in the first agglomeration precipitation tank 2, a part of the first agglomerated and precipitated sludge 17 that is removed from the bottom of the apparatus is returned as returning sludge 17a to the first reaction tank 1 where it is mixed with untreated waste water to promote flock formation, while the remainder is stored and retained in the sludge storage tank 5.

When the sludge has reached a predetermined level in the sludge storage tank 5, the sludge is fed via dehydrator 6, such as filter press, centrifuge, etc., to dryer 7 where it is dried at 200° C. or thereabout, further to calcination oven 8 where it is calcined. The temperature for calcination is preferably 550° C. or higher. Because calcination does not require extremely high temperature, a temperature in the range of 550° to 700° C. is preferable. The calcined product thus obtained, after being embedded in the ground, will have difficulty eluting toxic components into ground water, thus minimizing its effect on the environment.

After the above solid/liquid separation in the first agglomeration precipitation tank 2, the treated solution is introduced into the second reaction tank 3 where the pH is adjusted to pH 6–9 by adding an iron salt (e.g. ferric salt 14) and, if necessary, an acid (e.g. hydrochloric acid 13), whereby the arsenic present in the solution forms iron arsenate which is then encompassed by the flock of ferric hydroxide produced, coincidentally, and coprecipitated with the flock. Although ferric chloride and ferric sulfate can be used as iron salts, ferric sulfate is not preferred because the amount of sludge is increased due to the formation of calcium sulfate. Ferric chloride is most preferred.

The ferric salt is added in such an amount as to keep the weight ratio Fe/As preferably in the rage of 5 to 20. If the ratio is less than 5, the desired effects may not be otained. On the other hand, the ratio of 20 or more is not usually required.

This reaction solution is introduced into the second agglomeration precipitation tank 4. When the high-molecular flocculant 15 is added to the reaction solution in the second agglomeration precipitation tank 4 or during the passage through its inlet tube, the flock becomes agglomerated to facilitate separation by precipitation. In this case, too, the solid/liquid separation (second solid/liquid separation) is not limited to the example below, e.g., filtration may also be adopted. After being stood in the second agglomeration precipitation tank 4, a part of the second agglomerated and precipitated sludge 18 that is removed from the bottom of the apparatus is returned to the first reaction tank 1 or to the second reaction tank 3 to promote the flock formation. If the concentration of arsenic in the starting waste water is low, the second agglomerated and precipitated sludge 18 may be discharged directly to the sludge storage tank 5. The supernatant water thus separated in the second agglomeration precipitation tank 4 is almost free of arsenic and may be discharged as treated water 16 satisfying the effluent standard.

(EXAMPLE 1)

Slaked lime was added to arsenic-containing waste water which is a sample of sulfuric acid plant waste water discharged from a copper refining factory (see Table 1 for the composition). The waste water was then filtered through a glass filter with a pore size of 1 μm. Then, the correlation between the added amount of slaked lime (shown in terms of the pH values of the waste water) and the content of As in the treated water was examined. The results are shown in Table 2.

The results indicated that the concentration of As in the treated water dropped to 50 mg/l or less by adding slaked lime to adjust the pH to 12.0 or higher, and significantly to 5 mg/l or less by adding slaked lime to adjust the pH to 12.5 or higher. However, it was found difficult that the effluent standard of 0.1 mg/l or less arsenic, as stipulated under the regulation of the Japanese Prime Minister's Office is achieved by this treatment alone.

TABLE 1

| | Composition (mg/l) | | | | |
|---|---|---|---|---|---|
| pH | As | Cu | Mo | Al | $H_2SO_4$ |
| 1.2 | 11000 | 75 | 27 | 24 | 130000 |

TABLE 2

| | Starting Water | Treated Water | | | |
|---|---|---|---|---|---|
| pH | 1.2 | 11.5 | 12.0 | 12.5 | 12.7 |
| As content(mg/l) | 11000 | 210 | 49 | 3.6 | 1.4 |

(EXAMPLE 2)

Slaked lime was added to the same waste water as in Example 1 to adjust the pH to 12.0. The waste water was then filtered through a glass filter with a pore size of 1 μm. Then, ferric chloride was added as ferric salt to the filtrate, and then filtered likewise through the glass filter with a pore size of 1 μm. Then, the correlation between the added amount of ferric salt and the content of As in the treated water was examined. The results are shown in Table 3. The results indicated that even when the concentration of As in the starting waste water is as high as 11000 mg/l, it can be lowered to 0.1 mg/l or less by a two step treatment, i.e., by treating it with slaked lime and then adding ferric salt in the amount of 5-fold or more with regard to the weight ratio of Fe/As. Thus, it was found that the effluent standard of 0.1 mg/l or less arsenic, as stipulated under the regulation of the Japanese Prime Minister's Office can be easily achieved.

TABLE 3

| Amount of Ferric Chloride Added | mg/l | No Addition | 137 | 245 | 489 | 980 |
|---|---|---|---|---|---|---|
| | Fe/As Ratio | 0 | 2.8 | 5 | 10 | 20 |
| As content (mg/l) | | 49 | 0.9 | 0.1 | 0.06 | 0.02 |

(EXAMPLE 3)

Figure 3:
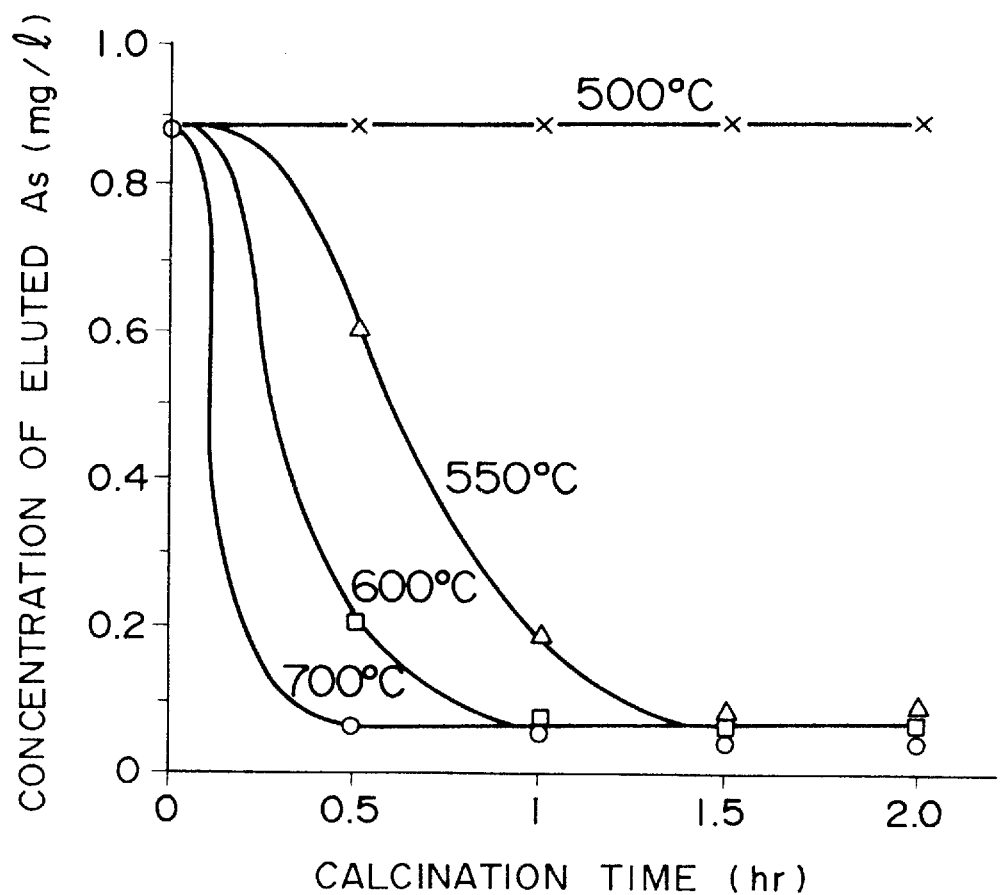
FIG. 3 is a graph showing the correlation between calcination conditions and the concentrations of As eluted from calcined products.

Slaked lime was added to the same waste water as in Example 1 to adjust the pH to 12.7. The waste water was then filtered through a glass filter with a pore size of 1 μm. The resulting sludge was dried at 200° C. until its water content dropped to 20% or less. Then, the dried sludge was calcined in a calcination oven and the correlation between the calcination conditions and the concentration of eluted As from the calcined product was examined. The results are shown in Table 4 and FIG. 3. The results indicated that the concentration of arsenic eluted from the calcined product varied significantly depending on calcination temperature. While the elution concentration hardly changed after the calcination at 500° C., even after an extended time, it dropped abruptly after calcination at 550° C. or higher. It was found that the limit of 0.3 mg/l or less arsenic as stipulated under the enforcement regulation of the Japanese Waste Disposal Law can be easily achieved by calcination for about 1.5 hours at 550° C. or 1 hour at 600° to 700° C.

TABLE 4

| Calcination Conditions | Temperature (°C.) | No Treatment | 550 | 600 | 700 | 700 |
|---|---|---|---|---|---|---|
| | Time (hr) | — | 2 | 2 | 1 | 2 |
| Concentration of Eluted As (mg/l) | | 0.88 | 0.06 | 0.06 | 0.07 | 0.07 |

We claim:

1. A process for treating arsenic-containing waste water, comprising adding a calcium compound to said arsenic-containing waste water to adjust the pH to 12 or higher; separating the waste water into a first sludge and a first liquid phase, drying the first sludge to reduce the water content to 20% or less calcining the dried sludge at a calcination temperature of about 550° to about 600° C., adding a ferric salt to the first liquid phase to adjust the pH to from about 6 to about 9; and separating the salted liquid phase into a second sludge and a second liquid phase.

2. The process of claim 1, wherein the second sludge is returned to the first liquid phase.

3. The process of claim 1, wherein said ferric salt is added in an amount sufficient to keep the weight ratio of the iron component of the added ferric salt to the arsenic in the waste water in the range of from about 5 to about 20.

4. The process of claim 1, wherein the second sludge is returned to untreated waste water.

5. The process of claim 1, wherein the second sludge is returned to the calcium treated waste water.

6. The process for treating arsenic-containing waste water, comprising adding an oxidizing agent to said arsenic-containing waste water to oxidize trivalent arsenic in the waste water into pentavalent arsenic; adding a calcium compound to adjust the pH to 12 or higher; separating the waste water into a first solid phase and a first liquid phase, drying the first solid phase to reduce the water content to 20% or less; calcining the dried solid phase at a calcination temperature of about 550° to about 600° C., adding a ferric salt to the first liquid phase to adjust the pH to from about 6 to about 9; and separating the salted liquid phase into a second solid phase and a second liquid phase.

7. The process of claim 6, wherein said ferric salt is added in an amount sufficient to keep the weight ratio of the iron component of the added ferric salt to the arsenic in the waste water in the range of from about 5 to about 20.

8. The process of claim 6, wherein the second solid phase is returned to the first liquid phase.

9. The process of claim 6, wherein the second solid phase is returned to untreated waste water.

10. The process of claim 6, wherein said ferric salt is added in an amount sufficient to keep the weight ratio of the iron component of the added ferric salt to the arsenic in the waste water in the range of from about 5 to about 20.

11. The process of claim 6, wherein the second solid phase is returned to the calcium treated waste water.

* * * * *